R. G. BAILEY.
BICYCLE SADDLE TRUSS AND SEAT POST CLAMP.
APPLICATION FILED AUG. 19, 1921.
1,431,356.
Patented Oct. 10, 1922.
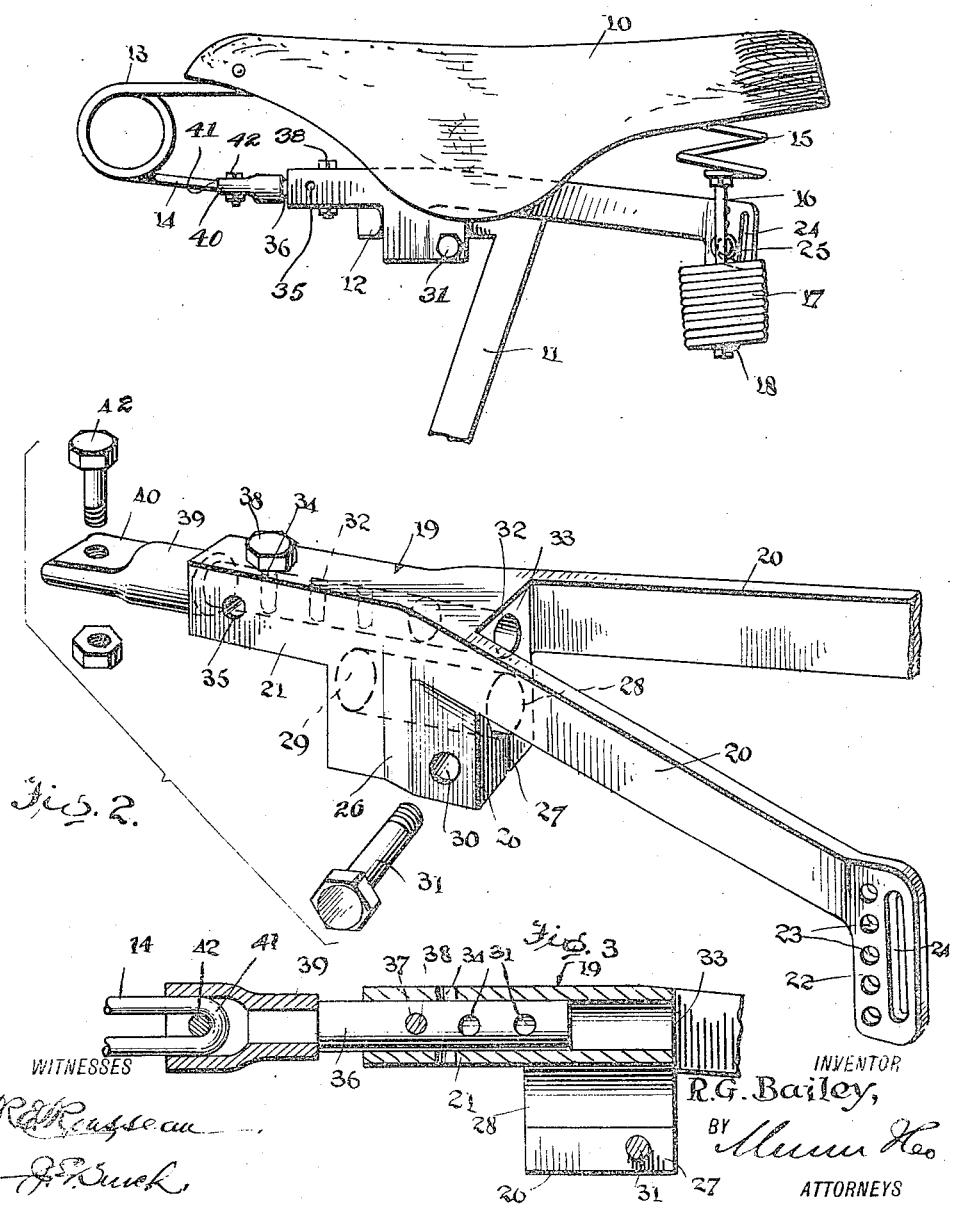

Patented Oct. 10, 1922.

1,431,356

UNITED STATES PATENT OFFICE.

RUFUS GEORGE BAILEY, OF SAN JOSE, CALIFORNIA.

BICYCLE SADDLE TRUSS AND SEAT-POST CLAMP.

Application filed August 19, 1921. Serial No. 493,546.

*To all whom it may concern:*

Be it known that I, RUFUS G. BAILEY, a citizen of the United States, and resident of San Jose and county of Santa Clara and State of California, have invented certain new and useful Improvements in Bicycle Saddle Trusses and Seat-Post Clamps, of which the following is a specification.

This invention relates to bicycle saddles and the like and more especially to an improved truss therefor.

The object of the invention is to provide a saddle truss which includes in combination a seat post clamp made of one rigid piece and provided at its rear end with novel means for adjusting the rear of the seat up and down in connection with the rear saddle spring and which obviates the necessity of employing a plurality of springs and other numerable parts rendering the same likely to get loose and out of order with subsequent loss of parts and inoperativeness of the saddle.

Another object is to provide a bicycle saddle truss and seat post clamp having novel means for conveniently and securely connecting the same to the seat post and having at the forward end thereof an adjustable socket adapting the device to be connected with different types of front saddle springs, extending vertically or horizontally, such adjustment permitting the required tilt of the saddle from front to back and generally simplifying, cheapening and enhancing the value of devices of the character to which the invention relates.

Other and further objects of my invention will become readily apparent to persons skilled in the art, from a consideration of the following description when taken in conjunction with the accompanying drawings, wherein:—

Figure 1 is a side elevation showing a bicycle saddle equipped with the improved truss and seat post clamp.

Figure 2 is an enlarged perspective view of the improvement, one of the rear ends or legs of the truss being broken off, and Figure 3 is a vertical sectional view showing a different adjustment of the device.

Referring to the drawings in detail, there is shown a saddle 10 of the type employed in connection with bicycles or the like, said saddle being adapted to be supported through the medium of the improvement, upon the saddle post 11 supported in the frame in the usual manner and having the horizontal supporting or shank portions 12 at the upper end thereof and extending forwardly. The saddle spring is designated at 13 and is provided with one or more coils in the usual manner, terminating in a rearwardly extending vertical or horizontal loop 14, while at the rear end of the saddle, there are provided supporting springs 15 from which bolts 16 extend through the springs 17, the lower ends of the springs 17 having the bolts 16 fastened beneath them as indicated at 18, thus allowing the desired expansion and contraction during the cushioning movement of the seat, under the weight of the body.

The bicycle saddle truss and seat post clamp proper consists of a single piece of rigid casting or the like 19 which is of substantially Y-shaped in formation and is provided with a forward shank portion and rearwardly branching legs or ends 20 disposed in obtuse angled relation to the forwardly projecting portion 21 in a downwardly inclined direction. The rear ends terminate in vertical extension 22 extending downwardly from the free ends thereof and being provided with vertical series of spaced apertures 23 and an adjacent parallel slot 24, the said apertures and slots being adapted for connection with the bolt or spring supporting means 16 as indicated at 25 as shown in Figure 1 of the drawing in order to permit the rear end of the seat to be adjusted vertically up or down to give the required angular adjustment and to permit the seat to be tilted from the front to the back or vice versa as desired.

The casting 19 is in the form of a block having a depending portion 26 which is split vertically and longitudinally as indicated at 27 thus providing opposed resilient jaws which are tapered toward their forward ends and enlarged toward their rear ends, thus giving the required strength. The seat post shank 12 is designed to engage a horizontal opening 28 extending longitudinally and horizontally through the block 26 beneath the forwardly extending portion and forming a shoulder 29 at the forward end thereof to limit the projection of the shank 12, if desired. The opposed jaws of the enlarged rear portion of the block 26 are provided with opposed registering apertures 30 adapted to take a clamping bolt 31 whereby the jaws may be clamped upon the shank 12, thus securing the saddle in position upon the seat post.

Parallel to and above the circular opening 28 in the block 26 is a longitudinal opening or bore 32 which like the opening 28 is circular in cross section. The opening 32 extends entirely through the portion 21 of the casting 19, opening through the bight portion 33 between the legs or sides 20 and the portion 21, and is provided with opposed pairs of vertical and horizontal apertures 34 and 35 disposed one forwardly of the other in order that the strength of the casting will not be impaired and so as to allow adjustment of the seat connection. The opening 32 takes a bolt or shank 36 having a plurality of spaced apertures 37 adapted to be disposed in alignment with either the vertical openings 34 or the horizontal openings 35 and engaged by a clamping bolt 38 so as to hold the shank in an adjusted position, while permitting longitudinal adjustment or extension thereof with respect to the truss proper.

At the forward end of the bolt or shank 36 there is secured a sleeve 39 provided with a socket 40 designed to receive the bight portion 41 of the spring 13, the opposed sides of the socket having registering apertures for receiving the clamping bolt or the like as indicated at 42 so that a connection between the spring and the shank may be effected. As shown, the spring is horizontally arranged in Figure 1 but if the bight portion 41 is vertically arranged instead of horizontally, the spring socket 40 may be disposed vertically as shown in Figure 3 instead of horizontally as shown in Figures 1 and 2 of the drawings, the bolt 38 being extended through the apertures 35 and through one of the openings 37 of the shank, instead of through the vertical openings 34, the shank or bolt 36 being adapted to be turned as well as adjusted longitudinally for this purpose thus giving the required adjustment for length as well as laterally so that the device will be accommodated to the particuar form of spring employed in connection with the saddle. It is to be understood that the seat or leather saddle proper is secured to the saddle spring in the usual or any preferred manner, the bolt being separate and apart from such fastening means. Furthermore, by reason of the particular shape of the casting forming the truss and clamp the device, may be very economically produced thus greatly cheapening and simplifying structures of the character to which the invention relates and obviating the necessity of assembling a large number of parts likely to become lost or to get out of working order. Furthermore it will be understood that the seat may be adjusted to any desired angle with facility and dispatch.

In view of the foregoing, it is thought that the operation of the device will be readily understood and in view of the simplicity and practical value that it will readily commend itself to those skilled in the art.

Having thus described the invention what I claim is:—

1. The combination with a seat post having a horizontal shank portion, and a saddle having a front spring provided with a rearwardly extending and downwardly spaced bight portion, and rear side springs; of a substantially Y-shaped truss comprising a depending clamp engageable member having a depending clamp engageable with the shank of the seat post, a shank laterally and longitudinally adjustable in the forward end of the truss and having means for connection with the bight portion of the forward spring, and means at the rear end of the seat for adjustable connection with the truss to adjust the seat up and down at the rear.

2. A bicycle saddle truss and seat post clamp comprising a casting of Y-shape having a longitudinal opening and a clamping member depending therefrom and provided with a longitudinal slot to receive a seat post shank, means for connecting the forwardly extending portion of the casting to a front saddle brace, and an adjustable shank for connecting the rear portion of the casting to a rear saddle spring.

3. A truss of the class described comprising a substantially Y-shaped member having vertically extending and substantially parallel rear ends, a clamp extending below the bight portion of the member for detachable and adjustable engagement with a seat post, said depending portion having a longitudinal opening, an apertured shank extending into the opening, securing means extending through the forwardly extending portion and engageable with the apertured shank, and a socket at the forward end of the shank, said socket having means at the forward end of the same for connection horizontally or vertically with the saddle spring.

4. The combination with a seat post having a shank; of a truss having a clamp depending therefrom and adjustably connectible with the shank, a saddle having a forward spring, means for connecting the spring for longitudinal adjustment at the forward end of the truss, and means for adjustably connecting the rear end of the truss to the rear side springs of the saddle.

5. The combination with a saddle having a forward spring provided with a rearwardly extending loop and rear side springs, bolts suspended from said springs, cushioning springs mounted on the bolts, a truss having a forked rear portion and provided at the rear ends thereof with spaced apertures for adjustable connection with said bolts, said truss having a depending central enlargement provided with a central slot providing opposed resilient clamping jaws, said jaws having coacting recesses forming an opening to receive the post, a clamping bolt extending through the jaws to tighten the same on the post, said truss having a forwardly extending portion provided with a longitudinally extending opening, said forwardly extending portion having registering horizontal and vertical apertures therethrough, a shank having a series of openings in spaced relation therethrough to align with the vertical or horizontal apertures, said shank having a forward enlargement providing a shoulder to limit the rearward displacement thereof and provided with a flat socket for horizontal or vertical disposition to receive the loop of the saddle spring therein, and clamping means in the socket to secure the saddle spring in position.

6. A bicycle saddle truss and seat post clamp comprising a casting having a shank portion and branching leg portions, the extremities of the leg portions being disposed inwardly in parallel relation and extending vertically, said portions being each provided with a spaced series of openings and an adjacent slot alongside thereof, a depending portion formed upon a casting and having means for engaging a seat post, the shank portion having a longitudinal opening extending through the bight of the truss and opposed horizontally and vertically registering apertures adjacent the forward end thereof, a shank extending in said opening, a securing means extending through the shank and apertures to hold the shank in an adjusted position longitudinally or laterally and a clamping member at the forward end of the adjustable shank.

7. In a truss of the class described, a longitudinally bored casting having a bottom clamp detachably engageable with a seat post, means at the rear ends of the casting for adjustable connection with a saddle to hold the same at any desired tilt, an extensible member engaged in the opening of the shank of the truss and provided with a flattened socket for receiving the front spring of a bicycle saddle, said socket having opposed apertures and a clamping member engaged with the apertures to secure the spring in position.

RUFUS GEORGE BAILEY.